United States Patent
Lefevre et al.

(10) Patent No.: US 8,282,998 B2
(45) Date of Patent: Oct. 9, 2012

(54) METHOD OF REALIZING AN OPTICAL FUNCTION ON A COMPONENT OF A MOTOR VEHICLE INDICATING OR LIGHTING DEVICE

(75) Inventors: Ghislain Lefevre, Bobigny Cedex (FR); Thomas Giroud, Bobigny Cedex (FR)

(73) Assignee: Valeo Vision, Bobigny (FR)

( * ) Notice: Subject to any disclaimer, the term of this patent is extended or adjusted under 35 U.S.C. 154(b) by 1054 days.

(21) Appl. No.: 10/729,184

(22) Filed: Dec. 4, 2003

(65) Prior Publication Data

US 2004/0170847 A1 Sep. 2, 2004

(30) Foreign Application Priority Data

Dec. 5, 2002 (FR) .................................... 02 15673

(51) Int. Cl.
| | |
|---|---|
| *B05D 3/06* | (2006.01) |
| *G02B 1/04* | (2006.01) |
| *G02B 1/12* | (2006.01) |
| *C23F 4/02* | (2006.01) |
| *B05D 5/02* | (2006.01) |
| *B05D 5/06* | (2006.01) |
| *B44C 1/20* | (2006.01) |
| *B44C 1/22* | (2006.01) |

(52) U.S. Cl. ........ 427/555; 427/556; 427/557; 427/162; 427/163.1; 427/164; 216/65; 216/94

(58) Field of Classification Search ........................ None
See application file for complete search history.

(56) References Cited

U.S. PATENT DOCUMENTS

| | | | | |
|---|---|---|---|---|
| 4,327,283 | A | * | 4/1982 | Heyman et al. ............... 235/487 |
| 4,954,422 | A | * | 9/1990 | Lamprecht et al. ......... 430/275.1 |
| 5,614,338 | A | * | 3/1997 | Pyburn et al. ................... 430/13 |
| 5,817,243 | A | * | 10/1998 | Shaffer ........................... 216/65 |
| 5,911,317 | A | * | 6/1999 | Tsai .............................. 200/514 |
| 5,997,162 | A | * | 12/1999 | English et al. ................ 362/508 |
| 6,012,830 | A | * | 1/2000 | Fraizer .......................... 362/539 |
| 6,017,138 | A | * | 1/2000 | Reiss et al. .................... 362/297 |

(Continued)

FOREIGN PATENT DOCUMENTS

EP 000652400 A1 * 5/1995

(Continued)

OTHER PUBLICATIONS

Webster's Ninth New Collegiate Dictionary, Merriam-Webster's Inc. ,1990 (no month), excerpt p. 406.*

(Continued)

*Primary Examiner* — Marianne L Padgett
(74) *Attorney, Agent, or Firm* — Locke Lord LLP

(57) ABSTRACT

The present invention relates to a method of realizing an optical function on a component of a motor vehicle indicating or lighting device. This method is more particularly suited to producing a mask for a headlamp or light and/or to treating reflective surfaces. The method comprises a step of forming said component in a predetermined material and a step of exposing at least one surface of said component to laser radiation.

3 Claims, 6 Drawing Sheets

U.S. PATENT DOCUMENTS

| | | | |
|---|---|---|---|
| 6,188,706 B1 * | 2/2001 | Robertson | 372/33 |
| 6,435,696 B1 * | 8/2002 | Foottit | 362/219 |
| 6,521,326 B1 * | 2/2003 | Fischer et al. | 428/198 |
| 6,627,299 B1 * | 9/2003 | Feng et al. | 428/207 |
| 6,727,308 B2 * | 4/2004 | Kniess et al. | 524/437 |
| 6,885,767 B1 * | 4/2005 | Howell | 382/173 |
| 2001/0019013 A1 * | 9/2001 | Weber et al. | 200/309 |
| 2002/0071940 A1 * | 6/2002 | Arnold et al. | 428/195 |
| 2004/0145289 A1 * | 7/2004 | Ouderkirk et al. | 313/113 |

FOREIGN PATENT DOCUMENTS

| | | | |
|---|---|---|---|
| GB | 2244934 A | * | 12/1991 |
| JP | 2000-176659 A | * | 6/2000 |

OTHER PUBLICATIONS

Webster's Ninth New Collegiate Dictionary, Merriam.-Webster's Inc., Springfield, Massachusetts, USA, 1990 (no month), excerpts pp. 406 & 532.*

Translation of JP 2000-176659 to Hideji Shizuku, "Method for Processing Character, Numerical, Mark, Pattern or the like on Transparent Material" Published Jun. 27, 2000.*

"1926-1927 model T headlights, chrome", printout from "www.Speedwaymotors.com", printed Dec. 3, 2008.*

Victor Page, The Model T Ford Car, it's Construction Operation and Repair, the Norman W. Handley publishing Co., New York, 1916 (no month), excerpts cover illustration, p. 159 & 161.*

* cited by examiner

METHOD OF REALIZING AN OPTICAL FUNCTION ON A COMPONENT OF A MOTOR VEHICLE INDICATING OR LIGHTING DEVICE

FIELD OF THE INVENTION

The present invention relates to a method of realizing an optical function on a component of a motor vehicle indicating or lighting device. This process is more particularly suited to producing a mask for a headlamp or light or to producing a reflector.

BACKGROUND OF THE INVENTION

Very often, for optical and/or aesthetic reasons, the mask of a motor vehicle headlamp must be metallized. This mask may cover not only the dipped beam lights, the full beam lights and the sidelights, but also the direction indicator. A transparent screen that is amber in color must then be placed in front of the direction indicator.

One solution consists in using a part that is made of an amber-colored plastics material and is suited to the mask; this part is fixed to the mask.

However, the addition of this additional part entails a significant additional cost which is due not only to the cost of the part itself but also to the assembly of the mask and the part.

The metallization of the mask also causes the reflection of light in certain zones, thus causing parasitic light rays. It is also possible to find zones of parasitic reflection at the reflector of the headlamp, which is itself metallized so as to exert its optical function of reflection.

One solution consists in making matt the zones that cause parasitic light rays, by texturing (ridges) the mould that is used to produce the mask.

The implementation of such a solution nevertheless causes some problems.

This is because the use of a mould with particular texturing makes the use of this mould relatively inflexible for other applications.

Moreover, the mould may easily wear out or be contaminated by impurities.

Furthermore, the zones of parasitic reflection are not located at the same point of the reflector, depending on whether the latter is used for a vehicle with right-hand or left-hand drive. Two different moulds are thus necessary for producing these two types of reflector.

Finally, in the case of a reflector, the material used is a thermosetting material, an injected metal or stamped sheet metal, since the reflector is used for full beam lights which heat up to high temperatures, thereby making it impossible to use a thermoplastics material; for this type of thermosetting material, the texturing of the mould is impossible since it causes problems of crumbling at the time of removal from the mould.

SUMMARY OF THE INVENTION

The present invention aims to provide a method of realizing an optical function on a component of a motor vehicle indicating or lighting device, which makes it possible to add, at low cost and in a small amount of space, optical functions such as a screen of amber color for a direction indicator in a headlamp and to use moulds without particular texturing or marking to produce a matt zone on parts such as masks.

The present invention for this purpose proposes a method of realizing an optical function on a component of a motor vehicle indicating or lighting device, comprising a step of forming said component in a predetermined material.

According to the invention, said method comprises a step of exposing at least one surface of said component to laser radiation.

The starting point is thus a component formed, for example by molding, in a material such as a plastics material which may or may not be metallized. Laser technology then makes it possible to carry out either selective ablation on said component when the latter is metallized or exposure directly on the plastics material.

The ablation of a particular metal surface does not affect the plastics material and thus allows a zone of plastics material to appear. This zone corresponds to an optical function such as a screen.

The laser exposure directly on the plastics material makes it possible for example to texture part of the plastic surface, this part becoming less reflective after metallization.

Such a method thus makes it possible to start with a component without marking and offers great flexibility of use to realize particular optical functions or to produce zones of lesser reflection. The method does not involve either adaptation of the mask or an additional part.

This method also makes it possible to create light passages through a part such as a mask made of a metallized transparent plastics material, by creating, by means of ablation of a metal surface, a light window for example for a sidelight.

The method may also comprise a step of metallizing said component.

According to a first embodiment, the method comprises a step of complete metallization of said component prior to said step of exposure to laser radiation, said exposure step being a step of selective ablation by laser radiation of the metal of said surface of said metallized component.

According to a second embodiment, the predetermined material is a plastics material and said step of exposure to laser radiation is a step of texturing said surface of plastics material.

Advantageously, said texturing step is followed by a step of metallizing said component.

Advantageously, the laser radiation is produced by means of a YAG laser, a $CO_2$ laser or an excimer laser.

The present invention also relates to a component of a motor vehicle indicating or lighting device, obtained by the method according to the invention, said component being made of a predetermined material and comprising at least one surface obtained after exposure to laser radiation.

The present invention further relates to a component of a motor vehicle indicating or lighting device, obtained by the method according to the invention, said component being made of a plastics material and comprising a metallized surface and a non-metallized surface obtained after selective ablation of the metal by laser radiation.

According to one embodiment, said plastics material is transparent and amber in color.

This embodiment makes it possible for example to produce a screen of amber color for flashing on a headlamp mask.

According to another embodiment, said plastics material is transparent and colorless.

This embodiment makes it possible for example to produce a light passage, for example in the sidelight part of a headlamp mask.

The present invention finally relates to a component of a motor vehicle lighting device, obtained by the method according to the invention, said component being made of metallized plastics material and comprising a surface that does reflect light and a surface that does not reflect light.

Advantageously, said component comprises a plurality of surfaces that do not reflect light and a plurality of surfaces that do reflect light.

According to a first alternative, said plastics material is a thermosetting material.

It is thus possible to produce a reflector having surfaces that reflect light in order to exert their optical function and surfaces that are not reflective, making it possible to eliminate parasitic reflections. The non-reflective surface is obtained either by texturing the plastics material and then metallizing, or by attacking a metallized part in order to modify the texture of the metal. It is possible to produce a plurality of surfaces that do not reflect light in the same zone, the reflection of the light being weaker the higher the number of surfaces. It is moreover possible to use just one manufacturing mould to produce two types of reflector, depending on whether the vehicle is a vehicle with right-hand or left-hand drive, the step of selective exposure to laser radiation making it possible to differentiate the reflectors.

According to a second alternative, said plastics material is a thermoplastics material.

This second alternative makes it possible for example to produce masks for a headlamp that is metallized for aesthetic reasons, and to treat the surfaces that run the risk of reflecting parasitic rays.

According to another embodiment, said predetermined material is a metal such as aluminum.

Other features and advantages of the present invention will emerge from the following description of embodiments of the invention, given by way of illustration and in a manner that is in no way limiting.

BRIEF DESCRIPTION OF THE DRAWINGS

In the figures which follow.

DESCRIPTION OF THE PREFERRED EMBODIMENTS

Figure 1:
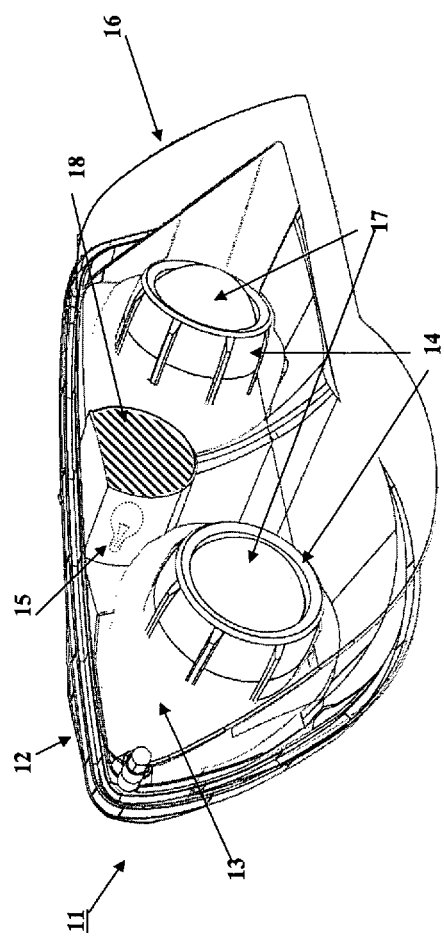
FIG. 1 schematically shows a headlamp comprising a direction indicator obtained by the method according to the invention,
FIG. 2 schematically shows a headlamp comprising a light passage obtained by the method according to the invention,
FIG. 3 schematically shows a headlamp comprising a mask having non-reflective zones obtained by the method according to the invention,
FIG. 4 schematically shows an axial horizontal section through a dipped/full beam reflector,
FIG. 5 schematically shows a front view of the reflector of FIG. 4 according to a first embodiment of the invention,
FIG. 6 schematically shows a front view of the reflector of FIG. 4 according to a second embodiment of the invention.

FIG. 1 schematically shows a headlamp 11 of a motor vehicle, comprising a transparent screen of amber color for a direction indicator, obtained by the method according to the invention.

The headlamp 11 comprises, in particular:
a casing 12,
a protective covering 16,
elliptical headlamp lenses 17,
a mask 13,
a bulb 15 for a direction indicator.

The three elements, casing 12, protective covering 16 and mask 13, are injection molded from a thermoplastics material.

The mask 13 comprises two orifices 14 for the elliptical headlamp lenses 17.

The mask 13 includes a transparent surface 18 of amber color that is located in front of the bulb 15 and acts as a screen for a direction indicator. This surface 18 forms an integral part of the mask 13.

The mask 13 is obtained by injection molding a thermoplastics material such as transparent polycarbonate that is dyed an amber color.

The mask 13 is then completely metallized with a layer of aluminum.

A laser of YAG type is then used to carry out selective ablation of the aluminum layer of the mask 13 corresponding to the surface 18, so as to allow the amber-colored plastics material to appear.

One example that may be taken is a YAG laser operating at a wavelength of 1064 nm, a rate of displacement of 900 mm/s, a power of 20 W and a frequency of 4500 Hz. A $CO_2$ laser or a laser of the excimer type may also be used.

A mask 13 that is metallized except on the surface 18 is thus obtained.

This method therefore makes it possible to realize an amber-colored screen function 18 for flashing without adding an additional part in the headlamp 11, by using only the material of the mask 13.

Figure 2:
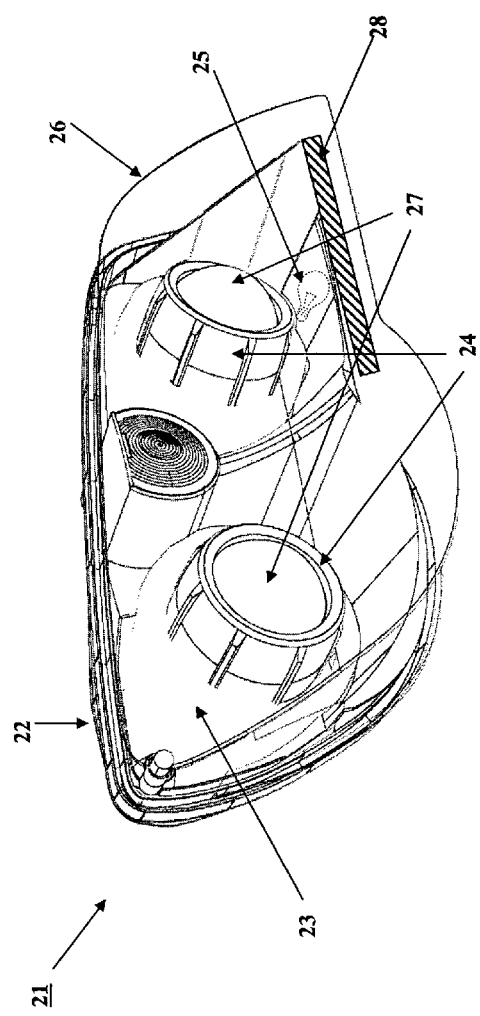

FIG. 2 schematically shows a headlamp 21 comprising a light passage obtained by the method according to the invention.

The headlamp 21 comprises, in particular:
a casing 22,
a protective covering 26,
elliptical headlamp lenses 27,
a mask 23,
a bulb 25 for a sidelight.

The three elements, casing 22, protective covering 26 and mask 23, are injection molded from a thermoplastics material.

The mask 23 comprises two orifices 24 for the elliptical headlamp lenses 27.

The mask 23 includes a transparent and colorless surface 28 that is located in front of the bulb 25 for a sidelight. This surface 28 forms an integral part of the mask 23.

The mask 23 is obtained by injection molding a thermoplastics material such as transparent and colorless polycarbonate.

The mask 23 is then completely metallized with a layer of aluminum.

A laser of YAG type is then used to carry out selective ablation of the aluminum layer of the mask 23 corresponding to the surface 28, so as to allow the transparent and colorless plastics material to appear. A $CO_2$ laser or a laser of the excimer type may also be used.

A mask 23 that is metallized except on the surface 28 is thus obtained.

This method therefore makes it possible to realize an optical light passage function for a sidelight without adding an additional part in the headlamp 21, by using only the material of the mask 23.

The surface 28 may be of different shapes such as a strip or ring, thus making it possible to recognize a certain category of vehicle by virtue of the shape of the surface illuminated by the sidelights.

Figure 3:
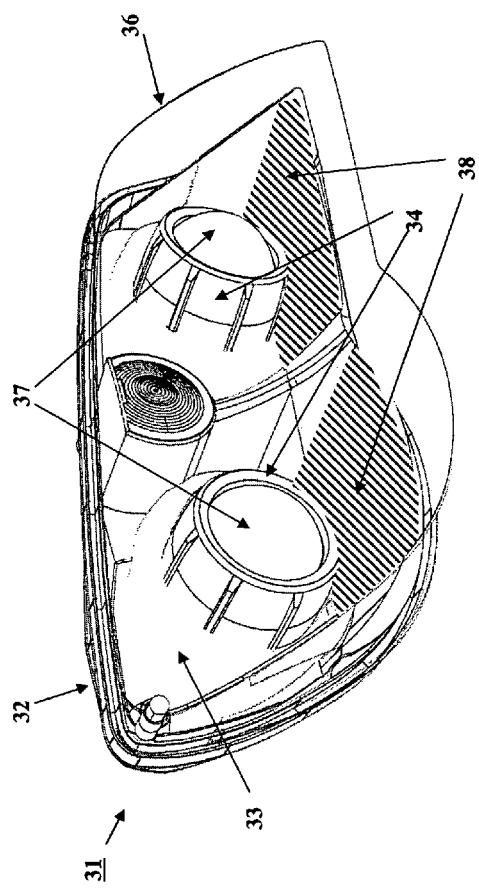

FIG. 3 schematically shows a headlamp 31 comprising a mask having non-reflective zones obtained by the method according to the invention.

The headlamp 31 comprises, in particular:
a casing 32,
a protective covering 36,
elliptical headlamp lenses 37,
a mask 33.

The three elements, casing 32, protective covering 36 and mask 33, are injection molded from a thermoplastics material.

The mask 33 comprises two orifices 34 for the elliptical headlamp lenses 37.

The mask 33 includes two surfaces 38 that do not reflect light.

The mask 33 is obtained by injection molding a thermoplastics material.

The thermoplastic zones corresponding to the surfaces 38 are first textured by exposure to laser radiation of the YAG type. A $CO_2$, laser or a laser of the excimer type may also be used.

The mask 33 is then completely metallized with a layer of aluminum.

A mask 33 is thus obtained that is completely metallized and comprises two textured and metallized surfaces 38 on which light is not reflected; the presence of parasitic light rays is thus avoided.

This method therefore makes it possible to produce an optical function of suppressing parasitic reflections on a metallized mask, without particular treatment of the mould used to injection mold the mask.

Figure 4:
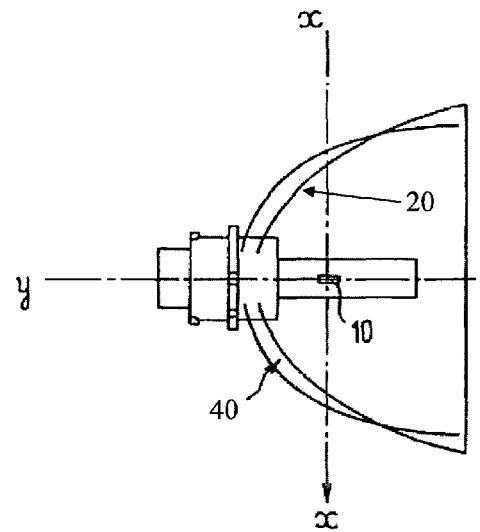

FIG. 4 schematically shows an axial horizontal section through a dipped/full beam reflector 40.

A light source 10, consisting for example of the arc of a gas discharge lamp, is fitted in the reflector 40.

The reflector 40 comprises a more or less elliptical inner face 20 which is metallized so as to reflect the light rays emitted by the source 10.

Figure 5:
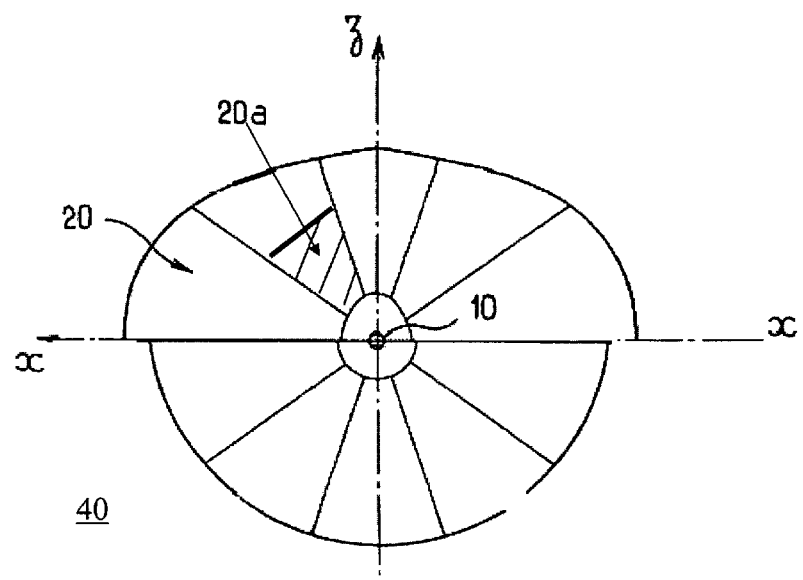

FIG. 5 schematically shows a front view of the reflector 40 of FIG. 4 according to a first embodiment of the invention.

The metallized inner face 20 comprises a non-metallized zone 20a that does not reflect light. Note that this zone 20a may also comprise a plurality of motifs that do not reflect light; in the latter case, the zone 20a is partially reflective, it being possible to modulate the reflection as a function of the number of motifs.

The reflector 40 is obtained by injection molding a thermosetting plastics material.

The face 20 of the reflector 40 is then completely metallized with a layer of aluminum.

A laser of YAG type is then used to carry out selective ablation of the aluminum layer of the face 20 corresponding to the zone 20a, so as to allow the plastics material to appear. A $CO_2$ laser or a laser of the excimer type may also be used.

A face 20 that is metallized except on the surface 20a is thus obtained.

Figure 6:
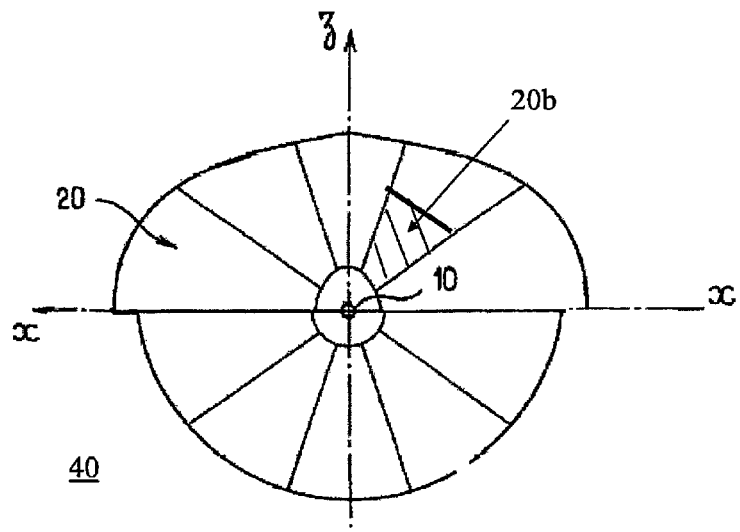

FIG. 6 schematically shows a front view of the reflector 40 of FIG. 4 according to a second embodiment of the invention.

The reflector 40 as shown in FIG. 6 is identical to that shown in FIG. 5 except that it does not comprise the non-reflective zone 20a but comprises a non-reflective zone 20b that is symmetrical to the zone 20a with respect to the axis z.

The method of obtaining such a reflector is identical to the method described with reference to FIG. 5. The method according to the invention makes it possible to use the same mask to produce the two reflectors as described respectively with reference to FIGS. 5 and 6. Thus, the same mask can be used to produce reflectors used in vehicles with right-hand and left-hand drive. The step of selective laser ablation thus makes it possible to differentiate the reflectors by incorporating one or more non-reflective zones.

Of course, the invention is not limited to the embodiments that have just been described.

In particular, the materials described that were subjected to laser radiation were plastic and aluminum, but other materials may also be used, such as other metals.

Moreover, the invention has been described solely in the case of forming by injection molding, but forming by stamping may also be used, in particular when using a material such as sheet metal.

Likewise, the description related to injection molding of plastics material but it may also involve injection of a material such as aluminum, the laser radiation acting directly on a surface of the part made of aluminum.

Furthermore, the invention has been described solely in the case of a headlamp but it may also be applied to other devices used for motor vehicle indicating or lighting, such as rear light elements.

What is claimed is:

1. A method of providing a motor vehicle reflector having at least one pre-selected matt zone, the method comprising:
    injection molding a plastics material into a predetermined shape having a surface;
    exposing a portion of the surface to laser radiation to texture the portion of the surface; and
    applying a metal layer onto the surface of the laser radiation exposed material to form said reflector, the metallized surface of the material being reflective except for the portion exposed to laser radiation that defines a pre-selected matt zone that is not reflective.

2. The method according to claim 1, wherein the applying a metal layer step comprises completely metallizing the surface with a layer of aluminum.

3. A method of manufacturing right and left-side headlamp reflectors from a single mold, the method comprising:
    injection molding a plastic material in a single mold to provide two identical components, each component having an elliptical inner face;
    metallizing the inner faces of the two identical components to provide two metallized components that reflect light rays emitted by a light source; and
    producing a right-side headlamp reflector and a left-side headlamp reflector from the metallized components by selective laser ablation of the metallized inner faces to provide non-metallized zones that do not reflect light on the inner faces.

* * * * *